United States Patent [19]

Pons et al.

[11] Patent Number: 4,477,623
[45] Date of Patent: Oct. 16, 1984

[54] PROCESS FOR THE PREPARATION OF POLYMER DISPERSIONS

[75] Inventors: Dick A. Pons, Maassluis; Anno Bijker, Spijkenisse, both of Netherlands

[73] Assignee: Syrnes International B.V., Hoek Van Holland, Netherlands

[21] Appl. No.: 461,493

[22] Filed: Jan. 27, 1983

Related U.S. Application Data

[63] Continuation-in-part of Ser. No. 356,066, Mar. 8, 1982, abandoned, which is a continuation of Ser. No. 249,872, Apr. 1, 1981, abandoned.

[30] Foreign Application Priority Data

Apr. 2, 1980 [NL] Netherlands .......................... 8001928

[51] Int. Cl.³ .............................................. C08K 5/49
[52] U.S. Cl. .................................... 524/710; 524/714; 524/755; 524/759; 524/807; 524/817; 524/832; 526/209
[58] Field of Search ................. 526/209; 524/807, 817, 524/832, 522, 710, 714, 755, 759

[56] References Cited

U.S. PATENT DOCUMENTS

| | | | |
|---|---|---|---|
| 3,352,838 | 11/1967 | Toepfl et al. | 260/80.73 |
| 3,516,975 | 6/1970 | Meincke | 260/80.6 |
| 3,536,682 | 11/1970 | Brown et al. | 260/86.7 |
| 4,100,339 | 7/1978 | Konig et al. | 526/143 |

*Primary Examiner*—Joseph L. Schofer
*Assistant Examiner*—B. Lipman
*Attorney, Agent, or Firm*—Cushman, Darby & Cushman

[57] ABSTRACT

An improved paint composition comprises an aqueous dispersion of a water insoluble addition polymer formed substantially of monomers selected from the class consisting of styrene, acrylates, methacrylates, vinyl esters, and vinyl chloride; at least one anionic or non-ionic emulsifier; at least one polyoxyethylene-chain-containing compound with between 60 and 400 oxyethylene units; and a minor amount of at least one alkali-soluble addition polymer. The emulsifier may itself be a polyoxyethylene-chain-containing compound. The unsaturated monomers comprising the water insoluble addition polymer include at least one monomer containing a phosphoric acid, sulphonic acid, or carboxylic acid group or a group functioning as an emulsifier.

11 Claims, No Drawings

PROCESS FOR THE PREPARATION OF POLYMER DISPERSIONS

This is a continuation in part of U.S. Ser. No. 356,066 filed Mar. 8, 1982; In turn a Rule 60 continuation of U.S. Ser. No. 249,872 filed Apr. 1, 1981 both now abandoned.

The invention relates to a process for the preparation of aqueous dispersions of a water-insoluble polymer, useful, for instance, as paint binders. In particular, the invention relates to dispersons which can be employed in combination with a polymer soluble in an aqueous alkaline environment.

It is already known that an aqueous dispersion of certain water-insoluble addition polymers, combined with a polymer which is soluble in an aqueous alkaline environment, can be employed as a binder for gloss paint. The coating obtained is substantially formed by the insoluble polymer. The alkali-soluble polymer ensures good brushability of the system, in particular good flow behavior, and a good gloss, and is often used as a grinding aid for the pigment to be included in the paint.

A disadvantage of the known systems, as described in British Patent specification No. 1,500,517, among others, is that a relatively large quantity of the alkali-soluble polymer is required to obtain good brushability, in particular good flow. Due to the presence of comparatively large quantities of alkali-soluble polymer, however, the coating then becomes sensitive to moisture penetration, and the alkali resistance and the adhesion to the substrate deteriorate.

The purpose of the invention is to provide an improved aqueous polymer dispersion, in particular a dispersion that can be applied as a binder for gloss paint.

According to the invention, an aqueous dispersion of a water-insoluble polymer is prepared by the addition polymerization of unsaturated monomers in water with an appropriate initiator and at least one emulsifier, with at least one such monomer containing a phosphoric acid, sulphonic acid or carboxylic acid group or a group acting as emulsifier being employed in a quantity of between 0.1 and 5.0 wt. %, calculated relative to the total quantity of unsaturated monomers. The polymerization is further conducted in the presence of at least one non-ionic or anionic emulsifier in a quantity of between 0.1 and 10.0 wt. %, calculated relative to the total quantity of unsaturated monomers, and with at least one compound being present which contains a polyoxyethylene chain containing between 60 and 400 oxyethylene units and chosen from the class of polyethylene glycols, non-ionic or anionic non-copolymerizable emulsifiers containing a polyoxyethylene chain and non-ionic or anionic copolymerizable emulsifiers containing a polyoxyethylene chain.

The invention is based on the provision that at least one monomer built into the addition polymer contains a stabilizing acid group or an emulsifying group and that there is also present at least one compound with a long polyoxyethylene chain. By this combination, dispersions can be obtained which possess long shelf life and good dispersion flow and good polymer water resistance. These dispersions can, in general, be employed in coating systems and paints, as additives in construction materials (plaster, cement and concrete mortars), and as impregnating agents and adhesives.

The dispersions are especially suitable for applications in which a polymer soluble in an aqueous alkaline environment is also added to the dispersion to improve its flow characteristics. It is now found that in this invention only a minor quantity of such alkali-soluble polymer is required to obtain a dispersion with good flow properties. Such mixed systems can thus be advantageously used for the aforementioned applications. They are especially suitable for application as lacquers and as binding agents in gloss paints, more specifically air-drying gloss paints.

The coatings thus obtained have a high gloss, good adherence properties, are re-coatable and have good resistance against water and alkali. The resulting paints have good brushability due to their excellent flow characteristics.

According to this invention, there should be at least one long-polyoxyethylene-chain-containing compound present during the polymerization. This chain should contain between 60 and 400 oxyethylene units. Henceforth, a polyoxyethylene group with n oxyethylene units will be indicated in complex compounds by ".nEO", as, for instance, in "nonyl phenol 0.100 EO". The value of n is the actual analytically-determined value.

Polyethylene glycol with a molecular weight of between about 2600 and 15,000 and preferably between 3500 and 6000 can be used as the compound with a long polyoxyethylene chain, and in a quantity of between about 0.1 and 5.0 wt. %, calculated relative to the quantity of unsaturated monomer. In addition to the polyethylene glycol, at least one anionic or non-ionic emulsifier should also be present. An emulsifier with a long polyoxyethylene chain, optionally copolymerizable, may instead be used. While use of polyethylene glycol itself gives good results, but has the disadvantage that an extra, water-soluble component is added in addition to the emulsifiers. For this reason, a suitable non-ionic or anionic emulsifier is preferably used as the long polyoxyethylene chain compound component.

Such non-ionic or anionic non-copolymerizable emulsifiers with a long polyoxyethylene chain can either be employed separately or in combination in a quantity of between about 0.1 and 10 wt. %, preferably between about 0.5 and 7.5 wt. %, and in particular between about 1.0 and 5.0 wt. %, calculated with respect to the quantity of unsaturated monomer. The polyoxyethylene chain therein should contain between about 60 and 400 oxyethylene units. The best results as regards the brushability, particularly the flow, of the dispersions and of lacquers and paints based thereon are achieved with compounds wherein such chains contain about 80 to 120 oxyethylene units.

Non-ionic emulsifiers having a long polyoxyethylene chain which can be potentially used herein include a polyoxyethylated $C_6$ to $C_{20}$ alcohols, a polyoxyethylated ($C_4$ to $C_{20}$) alkylphenols, polyoxyethylated phenol-formaldehyde condensates a polyoxyethylene-polyoxypropylene block copolymers, or adducts of ethylene oxide and propylene oxide on a polyamine, which adduct contains one or more polyoxyethylene chains. The latter two types of emulsifier should consist of more than about 60 wt. % and preferably at least about 80 wt. % of polyoxyethylene chain(s). Examples of suitable emulsifiers include:

nonyl phenol 0.80 EO;
nonyl phenol 0.100 EO;
decyl 0.200 EO;
nonyl phenol 0.120 EO;
stearyl 0.100 EO;

n-butyl phenol 0.100 EO;
dodecyl phenol 0.150 EO;
an ethyl oxide/propylene oxide (80/20) block copolymer with a molecular weight of 8700;
an adduct of ethylene oxide and propylene oxide on ethylene diamine consisting of 80 wt. % of oxyethylene units and with a molecular weight of 8000;
and other similar, generally commercially available, products. The above-mentioned types of emulsifier are preferably used in combination with a conventional anionic emulsifier containing only a few or no oxyethylene groups, to aid in the better control of the polymerization.

In general, the sulphonated, phosphated and carboxylated analogues of the above-mentioned non-ionic emulsifiers are potential anionic emulsifiers with a long polyoxyethylene chain, as such or in the form of alkali, ammonium or amine salts.

The carboxylate or phosphate product is preferably used, due to the still greater improvement of the flow behavior. Examples of such suitable compounds of this type are:
lauryl 0.120 EO phosphate;
dodecyl 0.100 EO phosphate;
nonyl 0.150 EO carboxylate;
nonyl phenol 0.80 EO sulphate;
nonyl phenol 0.100 EO carboxylate;
hexyl phenol 0.120 EO phosphate
and analogous compounds.

In addition to the non-copolymerizable emulsifiers with a long polyoxyethylene chain, other conventional non-ionic or anionic emulsifiers may also be present that contain few or no oxyethylene units. Examples of such non-ionic emulsifiers include:
nonyl phenol 0.20 EO;
n-butyl phenol 0.40 EO;
lauryl 0.25 EO
and ethylene oxide/propylene oxide block copolymers.

When using a non-ionic emulsifier with a long polyoxyethylene chain, it is of advantage additionally to use an anionic emulsifier containing few or no oxyethylene units. Examples of suitable anionic emulsifiers of this type include
di-($C_6$ to $C_{12}$ alkyl) sulphosuccinate,
dodecyl sulphate,
lauryl sulphate,
($C_4$ to $C_{20}$ alkyl) benzene sulphonate,
nonyl phenol 0.10 EO sulphate,
nonyl 0.5 EO phosphate,
lauryl 0.10 EO carboxylate,
stearyl 0.4 EO phosphate, and
n-octyl phosphate.
The total quantity of non-copolymerizable emulsifier is in all cases between about 0.1 and 10.0 wt. %, calculated relative to the quantity of unsaturated monomer.

A copolymerizable emulsifier (i.e., one with olefinic unsaturation) can also be used as the compound with a long polyoxyethylene chain, preferably in a quantity of between about 1.0 and 5.0 wt. %, calculated relative to the total quantity of unsaturated monomer. Examples here include:
nonyl phenol 0.100 EO (hydroxyethyl methacrylate) phosphate;
lauryl 0.120 EO (hydroethyl methacrylate) phosphate;
nonyl phenol 0.80 EO 2-sulphopropyl maleate;
a half-ester of maleic acid or fumaric acid with an ethylene oxide/propylene oxide block copolymer (70% EO, molecular weight 66500);
lauryl 0.90 EO 2-sulphopropyl itaconate;
butyl phenol 0.120 EO methacrylate;
and in general esters of a copolymerizable acidic compound with one of the non-ionic emulsifiers with long polyoxyethylene chains named above. These copolymerizable emulsifiers should also possess a group containing about 60 to 400 oxyethylene units, and preferably about 80 to 120 oxyethylene units.

In addition to the copolymerizable emulsifiers, one or more non-copolymerizable emulsifiers can be used.

In the polymerization there should be present between about 0.10 and 5.0 wt. %, calculated relative to the total quantity of unsaturated monomer, of copolymerizable emulsifier and/or a copolymerizable emulsion stabilizer possessing a sulphonic acid, phosphoric acid or carboxylic acid group. Here, "unsaturated monomers" are taken to include any unsaturated copolymerizable compounds present. Copolymerizable emulsifiers are themselves known per se. Examples include
dodecyl-2-sulphopropyl itaconate,
dodecyl-2-sulphopropyl maleate,
the alkali salts, ammonium salts, and amine salts thereof, and
the phosphates as described in U.S. Pat. No. 4,101,490, such as
dodecyl (hydroxyethyl acrylate) phosphate,
polyoxyethylene nonyl phenol (hydroxypropyl methacrylate) phosphate or
lauryl (hydroxyethyl methacrylate) phosphate.
The copolymerizable emulsifiers containing a long polyoxylene chain described elsewhere in this text can also be used. The copolymerizable emulsifier is generally used in an amount from about 0.1 to 4 wt. %; preferably, if it has a relatively low molecular weight, in an amount of between about 0.1 and 1.5 wt. % is used, and if the molecular weight is high, due to the presence of a large polyoxyethylene group, the quantity preferably used is, for instance, between about 1.0 and 4.0 wt. %.

Copolymerizable compounds which contain at least one phosphoric acid or sulphonic acid group and which can function as the emulsion stabilizer are generally also already known as such. Examples are bis-(2-sulphopropyl) itaconate and the corresponding fumarate and maleate compounds, parasulphophenyl methacrylate and salts thereof, 4-sulphobutyl methacrylate, 2-acrylamido 2-methylpropane sulphonic acid and salts thereof, and the mono- and diphosphate esters described in U.S. Pat. No. 4,110,285, such as mono-(2-hydroxypropyl methacrylate) phosphate. Such stabilizers possess at least one free acid group or a salt derived therefrom.

Unsaturated carboxylic acids also exhibit stabilizing activity. Examples of stabilizers containing a carboxylic group are acrylic acid, methacrylic acid, and half-esters of maleic acid, fumaric acid, itaconic acid and citraconic acid such as monobutyl maleate, monoethyl itaconate. However, to have a stabilizing effect, these carboxylic acid monomers must be located in the outer skin of the polymer particles. Therefore, in connection herewith, such carboxylic acid monomers intended as stabilizers should not be added until towards the end of polymerization. Those monomers containing a phosphoric acid or sulphonic acid group may be added arbitrarily in respect to time, and are for this reason to be preferred. However, monomeric carboxylic acids may also be used for other reasons, for example, to improve adhesion or for cross-linking. Insofar as they are added at the start of polymerization or throughout the polymerization, the carboxylic acids are left out of consideration in the calculation of the quantity of copolymerizable emulsion stabilizers used. The copolymerizable stabilizers are preferably employed in a quantity of between about 0.1 to 1.5 wt. %, calculated relative to the quantity of unsaturated monomer. It is generally slightly more effective to use copolymerizable emulsifiers than to build in acidic stabilizers, as regards the combination of emulsion stability, lacquer or paint flow and water resistance.

The water insoluble polymer itself is comprised of at least 50 percent by weight, calculated relative to the total quantity of unsaturated monomer, of commonly-employed olefinically unsaturated monomers selected from the class consisting of styrene, acrylates, methacrylates, vinyl esters, and vinyl chloride. Weight percents of these monomers exceeding 80% are particularly favorable. Such other monomers as acrylamide, N-alkoxymethacryl amide, α-methyl styrene, acrylonitrile, butadiene, unsaturated carboxylic acids, hydroxyalkyl(meth)acrylates, di-esters of maleic acid and the like may be used. Additional examples of suitable monomers not yet mentioned include methyl methacrylate, ethyl acrylate, butyl acrylate, 2-ethyl hexyl acrylate, dodecyl acrylate, lauryl acrylate, vinyl acetate, vinyl propionate, vinyl benzoate, vinyl versatate, glycidyl methacrylate, dibutyl maleate.

A polyfunctional unsaturated compound can also be employed in relatively small quantity, such as di-, tri- or tetra(meth)acrylate or a di- or tri-allyl compound. Examples here include diethylene glycol diacrylate, trimethylol propane trimethacrylate and propylene glycol diallyl ether. Preferably, a small quantity of an adhesion enhancing monomer is also introduced, to increase adhesion to the substrates, such as N-vinyl pyrrolidone, NN-dimethyl amino-ethanol acrylate, allyl acetoacetate, 2-vinyl pyridine and 4-vinyl pyridine. Suitable weight percentage amounts for these special additional monomers range from 0.2 to 5.0 wt. % and preferably 0.5 to 1.5 wt. % calculated with respect to the total quantity of unsaturated monomer.

In addition to the emulsifier(s), it is advantageous to employ a small quantity of a protective colloid. Suitable types include hydroxyethyl cellulose, polyvinyl alcohol, vinyl pyrrolidone homo- and copolymers, acrylamide homo- and copolymers, and methacrylic acid homo- and copolymers. Preferably, about 0.1 to 1.50 wt. % protective colloid is applied, calculated relative to the quantity of unsaturated monomers.

There may also be present in the polymerization mixture a quantity of free polyethylene glycol having a molecular weight of between about 1000 and 10,000, in a quantity of at most about 25 wt. %, calculated with respect to the quantity of emulsifiers containing a long polyoxyethylene chain. At higher levels, the coating gloss decreases pronouncedly. Such relatively minor quantities of polyethylene glycol are often present as a contaminant in commercially available emulsifiers. The total quantity of these compounds containing or consisting of a long polyoxyethylene chain should not, however, exceed 10 wt. %, calculated relative to the quantity of unsaturated monomers.

Polymerization is conducted in the usual way, either continuously or batchwise. A suitable continuous mode of operation is described in British Patent specification No. 1,220,777.

In a batchwise mode of operation, all the components may be added simultaneously, or part of the monomers and, if so desired, the emulsifier(s) and initiators may be added in portions during polymerization.

In general, a dispersion is prepared with a total resin solids content of between about 30 and 65 wt. %, with the mean size of the dispersed particles being about 200 and 1500 nm. The pH of the dispersion is adjusted after the end of polymerization to a value preferably between about 7.5 and 9, and most preferably about 8, to increase its stability. Suitable polymerization initiators include alkali and ammonium persulphates, organic peroxides and redox systems, for example, those with sodium thiosulphate, sodium metabisulphite or sodium formaldehyde sulphoxylate as reducing agent.

To increase the water resistance of the coatings, ammonium salts or amine salts are preferably used instead of alkali stalts.

The dispersions of the water-insoluble polymer obtained according to the invention are preferably employed in combination with an aqueous-alkaline-soluble polymer, e.g., one soluble in an aqueous alkaline (pH about 8) environment. In general, between about 1 and 25 wt. % of the alkali-soluble polymer may be present, calculated relative to the total addition polymer weight. Preferably, as little as possible of such alkali-soluble polymer will be used, because while it is true that this polymer enhances the flow behavior and the brushability of the paint, it nonetheless decreases the water resistance, alkali resistance, adhesion and re-coatability of the coats. Preferably, about 3 to 10 wt. % alkali-soluble polymer is used.

The binding agent system is made by mixing a solution of the alkali-soluble polymer into the dispersion prepared according to the invention. If very little, i.e., less than about 5 wt. %, alkali-soluble polymer is used, it may be added to the dispersion of the insoluble polymer without endangering the shelf life of the dispersion. The commercially available polymers soluble in an alkali environment and described e.g., in British Pat. No. 1,500,513 and U.S. Pat. No. 4,120,841 may be utilized. In general, these are copolymers consisting substantially of (meth)acrylates and unsaturated mono- or dicarboxylic acid units, for instance, of ethyl acrylate or butyl acrylate and (meth)acrylic acid, maleic acid or fumaric acid.

If desired, a second polymer dispersion may also be incorporated in the paint formulation in an amount of say up to 25 percent by weight of the dispersion according to the invention. This may be a conventional polymer dispersion, e.g., based on acrylic and/or methacrylic esters and/or styrene, serving to lower the price or to influence rheological properties of the paint. The paint formulation may contain further conventional additives such as biocidal agents, anti-foam agents, leveling agents dispersion aids and the like.

High-gloss paints may be prepared by known methods, e.g., by milling the pigment with the water-soluble polymer and adding this dispersion to the polymer dispersion obtained according to the invention.

The invention will now be elucidated with reference to the following Examples, however, without being restricted to the specific modes of realization described therein.

EXAMPLE I

An aqueous dispersion of a water-insoluble addition polymer was prepared in a reactor provided with a stirrer, inert-gas flushing system, temperature control and reflux cooler. In the reactor, 300 parts water were heated to 80° C., after which 19 parts of a 10 wt. % aqueous solution of ammonium persulphate was added. Immediately afterwards, metering-in of a specially prepared pre-emulsion was started. The pre-emulsion consisted of:

492 parts water
10 parts methacrylic acid
480 parts butyl acrylate
510 parts methylmethacrylate
37 parts nonyl phenol 0.100 EO ("long" nonionic emulsifier)
8 parts nonyl phenol 0.5 EO-phosphate (anionic emulsifier)
5 parts mono-lauryl-mono(hydroxyethyl methacrylate) phosphate (an emulsifier that can be built in, as per U.S. Pat. No. 4,101,490)
2 parts NN-dimethyl ethanol amine.

The pre-emulsion was added with stirring over a period of 3.5 hours, the temperature in the reactor being maintained at about 80° C. After this period, the whole system was allowed to continue reacting for a further hour at 85° C. The dispersion was then cooled to 25° C. and drained off through a screen. There was hardly any coagulation. A milky white dispersion with a solids content of about 56 wt. % was thus obtained. The pH was then adjusted to 8. All parts given in this and the following Examples are parts by weight.

EXAMPLES II-X

By the method described in Example I, dispersions were prepared using 480 parts butyl acrylate, 510 parts methyl methacrylate, 10 parts methacrylic acid and 5 parts lauryl-mono(hydroxyethyl methacrylate) phosphate and various combinations of non-copolymerizable emulsifiers. The quantities and types of emulsifier introduced are given below:

| Example II | 16 parts | sodium lauryl sulphonate |
| | 37 parts | nonyl phenol .100 EO |
| Example III | 8 parts | nonyl phenol .5 EO phosphate |
| | 37 parts | nonyl phenol .92 EO |
| | 5.5 parts | polyethylene glycol mol. wt. 5000 |
| Example IV | 16 parts | nonyl phenol .5 EO phosphate |
| | 37 parts | polyethylene glycol mol. wt. 6000 |
| Example V | 37 parts | nonyl phenol .120 EO |
| | 9 parts | lauryl .4 EO |
| Example VI | 8 parts | nonyl phenol .5 EO phosphate |
| | 37 parts | nonyl phenol .100 EO mono(hydroxyethyl methacrylate) phosphate, as per U.S. Pat. No. 4,101,490 |
| Example VII | 15 parts | nonyl phenol .150 EO |
| Example VIII | 8 parts | nonyl phenol .25 EO sulphate |
| | 18.5 parts | ethylene oxide/propylene oxide block copolymer mol. wt. 8700, with 80 wt. % EO (Pluronic F 68 from BASF Wyandotte) |
| | 18.5 parts | ethylene oxide/propylene oxide block copolymer mol. wt. 1900, with 50% EO (Pluronic L 35 from BASF Wyandotte) |
| Example IX | 8 parts | nonyl phenol .25 EO sulphate |
| | 17 parts | nonyl phenol .100 EO |
| | 20 parts | ethylene oxide/propylene oxide block copolymer mol. wt. 16,300, with 80 wt. % EO (Pluronic F 108 from BASF Wyandotte |
| Example X | 8 parts | nonyl phenol .5 EO phosphate |
| | 37 parts | $C_{12}$-$C_{13}$ alkanol .120 EO |

EXAMPLES XI-XV

By the method described in Example I, dispersions were prepared with other types and/or quantities of monomers and emulsifiers. The components employed are given below:

| Example XI | 480 parts | butyl acrylate |
| | 500 parts | methyl methacrylate |
| | 10 parts | methacrylic acid |
| | 10 parts | glycidyl methacrylate |
| | 5 parts | lauryl-mono(hydroxyethyl methacrylate) phosphate |
| | 8 parts | nonyl phenol .25 EO sulphate |
| | 37 parts | nonyl phenol .100 EO |
| Example XII | 560 parts | methyl methacrylate |
| | 430 parts | 2-ethyl hexyl acrylate |
| | 10 parts | methacrylic acid |
| | 2.5 parts | 2-acryloamido-2 methyl propane sulphonic acid |
| | 8 parts | nonyl phenol .25 EO sulphate |
| | 37 parts | nonyl phenol .120 EO |
| Example XIII | 480 parts | butyl acrylate |
| | 410 parts | methyl methacrylate |
| | 100 parts | styrene |
| | 10 parts | methacrylic acid |
| | 5 parts | lauryl-mono(hydroxyethyl methacrylate) phosphate |
| | 8 parts | nonyl phenol .100 EO |
| Example XIV | 350 parts | butyl acrylate |
| | 350 parts | methyl methacrylate |
| | 300 parts | butyl methacrylate |
| | 10 parts | methacrylic acid |
| | 5 parts | lauryl-mono(hydroxyethyl methacrylate) phosphate |
| | 37 parts | nonyl phenol .100 EO |
| | 5 parts | protective colloid (Luriskol K 30) |
| Example XV | 440 parts | butyl acrylate |
| | 550 parts | methyl methacrylate |
| | 10 parts | methacrylic acid |
| | 2.5 parts | lauryl-mono(hydroxyethyl methacrylate) phosphate |
| | 10 parts | nonyl phenol .25 EO sulphate |
| | 35 parts | nonyl phenol .100 EO |

COMPARATIVE EXAMPLES A AND B

By the method described in Example I, dispersions were also prepared with the types and quantities of unsaturated monomer quoted therein. Other emulsifiers were, however, used which, contrary to the compositions according to the invention, only contained relatively short polyoxyethylene chains. The emulsifier combinations were:

| Example A | 8 parts | nonyl phenol .5 EO phosphate |
| | 37 parts | nonyl phenol .50 EO |
| Example B | 8 parts | nonyl phenol .5 phos- |

|  | phate |
|---|---|
| 37 parts | ethylene oxide/propylene oxide block copolymer, mol. wt. 3500, with 50 wt. % EO (Pluronic P 65 from BASF Wyandotte). |

Preparation And Study Of Paints

Air-drying gloss paints based on the dispersions obtained according to the invention were prepared in the following way. In a dispersion beaker provided with water-cooling, 22 parts water, 2.5 parts propylene glycol and 6 parts of a dispersion of a polymer soluble in an alkaline environment (commercial product Viscalex VG 2, Allied Colloids) are mixed. Next, 3 parts 25-% ammonia are added. Owing to the increased pH, the polymer enters into solution, causing the viscosity of the of the mixture to increase. Then, 0.5 parts anti-foaming agent, 17.5 parts butyl carbitol, 80 parts titanium dioxide pigment and 80 parts glass beads are added. The mixture is ground in a bead mill for 25 minutes at 2500 revolutions per minute. After cooling, the glass beads are screened off and the resulting paste then stirred into the dispersion of the water-insoluble polymer. A paint composition is thereby obtained in which there are 12 parts insoluble addition polymer (calculated as solid matter) to each part of alkali-soluble polymer. The paint is diluted to measure with water and tested in the following manner.

The flow is assessed by applying the paint to glass with a brush. Evaluation runs from 1 (very poor, brush strokes clearly visible) to 5 (excellent, smooth finish under all circumstances).

The gloss is assessed after 7 days, based on the coat applied to the glass.

The re-coatability is assessed by applying to the dry coat another coat 0.078 mm wet thickness with the applicator, allowing this to dry for 24 hours and evaluating as to the combination of gloss, adhesion and swell.

The water resistance is assessed by applying a layer of the paint to be tested with a brush to wood grounded with an alkyd resin and allowing the paint to dry for 16 hours at 25° C. Drops of water are then applied to the coat and the time is measured until blisters are formed on the coat. Evaluation runs from 1 (very poor, blisters after 1 hour) to 5 (excellent, still no blisters after 6 hours). The adhesion of the coat to the substrate was then investigated.

A number of the dispersions obtained according to the foregoing Examples were thus applied in paint. The test results are summarized in Table 1.

TABLE 1

| Dispersion As Per Example | Flow | Gloss | Re-Coat-ability | Water Resist-ance | Adhesion After Water Resist-ance |
|---|---|---|---|---|---|
| I | 4 | 90/70 | 5 | 5 | 2 |
| II | 3.5 | 88/75 | 1.5 | 5 | 2 |
| III | 4 | 92/70 | 4 | 5 | 2.5 |
| IV | 3 | 86/50 | 2 | 5 | 4 |
| V | 3.5 | 87/62 | 4.5 | 5 | 3 |
| VI | 3 | 86/50 | 3 | 5 | 3 |
| VII | 3 | 91/55 | 5 | 5 | 5 |
| VIII | 3 | 90/71 | 2.5 | 5 | 2.5 |
| IX | 3 | 88/60 | 3 | 4 | 3 |
| X | 4 | 85/61 | 5 | 5 | 4 |
| XI | 3 | 91/60 | 2 | 5 | 5 |
| XII | 3.5 | 88/54 | 1 | 5 | 3 |
| XIII | 3 | 94/78 | 4.5 | 1.5 | 2 |
| XIV | 3 | 90/60 | 3 | 5 | 3 |
| XV | 4 | 83/47 | 3 | 5 | 3 |
| A | 1 | 90/50 | 5 | 3 | 2.5 |
| B | 1 | 90/38 | 4 | 1 | 2.5 |

The main goal of the invention is to provide polymer dispersions which can be formulated to gloss-paints with an improved flow and a satisfactory balance of other coating characteristics. Prior art gloss paints contain a rather large amount for example 20 weight % based on the dispersed polymer or even more, of an alkali-soluble polymer in the dissolved state, in order to obtain a satisfactory flow. The presence of such a large amount of alkali-soluble polymer has a very unfavorable effect on the other coating characteristics such as the water-resistance and the substrate adhesion. The table at page 16 shows that paints based on polymer dispersions according to the invention all have a 'satisfactory' to 'good' flow even though they contain only a limited amount of alkali-soluble polymer. The comparative formulations A and B show that paints containing the same amount of alkali-soluble polymer but based on polymer dispersions not containing the 'long polyoxyethylene chain' do have a very poor flow. The addition of more alkali-soluble polymer to formulation A or B could bring the flow to an acceptable level but at the same time would cause the water-resistance and adhesion to drop to an unacceptable low level, making the paint unsuitable for out-door use.

Formulations I to X show the effect of variation of the emulsifier system, with the system used in example VII clearly leading to a very good all-purpose paint. Formulations XI to XV show the effect of different combinations of monomers and other components used in preparation of the polymer dispersion. Formulation XIII shows a remarkably high gloss, but the water resistance and wetted substrate adhesion would preclude out-door use. Formulation XIV to the contrary would be a good high gloss all-purpose paint.

What is claimed is:

1. An aqueous paint composition, comprising at least one dispersed water-insoluble addition polymer and at least one alkali-soluble addition polymer, one or more pigments and conventional additives, wherein A. said water-insoluble addition polymer is formed by copolymerizing, in water, at least one unsaturated monomer selected from the group consisting of styrene, acrylates, methacrylates, vinyl esters, and vinyl chloride,
said addition polymer further including, in an amount between 0.1 and 5.0 wt. % relative to the total amount of said unsaturated monomers, at least one monomer containing a phosphoric acid, sulphonic acid, or carboxylic acid group functioning as emulsifier, and in the presence of
(i) an effective initiator
(ii) at least one anionic or non-ionic emulsifier, and (iii) at least one compound containing a polyoxyethylene chain having between 60 and 400 oxyethylene units, with said compound selected from the group consisting of
  (a) polyethylene glycols present in an amount between 0.1 and 5.0 wt. % relative to the total quantity of said unsaturated monomers, and
  (b) ethoxylated anionic and non-ionic emulsifiers containing said polyoxyethylene chain, and B. said alkali-soluble polymer is a copolymer consisting of acrylates or methacrylates and unsaturated mono- or dicarboxylic acid units, and is present in an amount of between 1 and 25 wt. % relative to the total amount of said addition polymers.

2. The composition of claim 1, wherein said polyoxyethylene-chain-containing compound contains between about 80 and 120 oxyethylene units.

3. The composition of claim 1, wherein said anionic or non-ionic emulsifier is a compound with a polyoxyethylene chain consisting of 60–400 oxyethylene units and is present in an amount between about 0.5 and 7.5 weight % calculated relative to the weight of said unsaturated monomers.

4. The composition of claim 3, wherein said non-ionic emulsifier is chosen from the group formed by ethoxylated $C_6$–$C_{20}$ aliphatic alcohols, ethoxylated ($C_4$–$C_{20}$ alkyl) phenols, adducts of ethylene oxide and propylene oxide on a polyamine, which adducts consist of at least 60 wt. % of oxyethylene units, and ethylene oxide/propylene oxide block copolymers consisting of at least 60 wt. % of oxyethylene units.

5. The composition of claim 3 which contains at least one anionic emulsifier and at least one non-ionic emulsifier.

6. The composition of claim 1, wherein between about 0.5 and 7.5 wt. %, calculated relative to the quantity of unsaturated monomer, of a non-copolymerizable anionic emulsifier with a polyoxyethylene chain consisting of about 60 to about 400 oxyethylene units is employed.

7. The composition of claim 6, wherein said anionic emulsifier is chosen from the group of phosphated, carboxylated or sulphonated derivatives of ethoxylated $C_6$–$C_{20}$ aliphatic alcohols and ethoxylated ($C_4$–$C_{20}$ alkyl) phenols, and salts thereof.

8. The composition of claim 7, wherein said emulsifier is a carboxylate or phosphate.

9. The composition of claim 1, wherein said polyoxyethylene-chain-containing compound is a copolymerizable emulsifier with a polyoxyethylene chain consisting of about 60–400 oxyethylene units and is present in a quantity of between about 0.5 and 5.0 wt. %, relative to the quantity of total unsaturated monomer.

10. The composition of claim 1, wherein said copolymerizable monomer containing a phosphoric acid or sulphonic acid group is present in an amount between about 0.1 and 1.5 wt. % relative to the amount of total unsaturated monomer.

11. The composition of claim 1, wherein said anionic or non-ionic emulsifier is a copolymerizable emulsifier not containing a long polyoxyalkylene chain and is present in an amount between about 0.1 and 1.5 wt. %.

* * * * *